United States Patent

Mori et al.

[11] Patent Number: 5,905,139
[45] Date of Patent: May 18, 1999

[54] PURIFICATION OF POLYSILANE

[75] Inventors: Shigeru Mori; Eiichi Tabei; Kazumi Noda, all of Usui-gun, Japan

[73] Assignee: Shin-Etsu Chemical Co., Ltd., Japan

[21] Appl. No.: 08/992,964

[22] Filed: Dec. 18, 1997

[30] Foreign Application Priority Data

Dec. 19, 1996 [JP] Japan ..................................... 8-354534

[51] Int. Cl.$^6$ ....................................................... C08F 6/00
[52] U.S. Cl. ............................ 528/491; 528/10; 528/480; 528/488; 528/493; 528/494; 528/495; 528/496; 528/499; 528/502
[58] Field of Search ............................. 528/10, 480, 488, 528/491, 493, 494, 495, 496, 499, 502

[56] References Cited

U.S. PATENT DOCUMENTS

| 4,987,202 | 1/1991 | Zeigler | 528/10 |
| 5,599,892 | 2/1997 | Hayashida | 528/10 |
| 5,641,849 | 6/1997 | Nishida et al. | 528/10 |

*Primary Examiner*—Samuel A. Acquah
*Attorney, Agent, or Firm*—Millen, White, Zelano & Branigan, P.C.

[57] ABSTRACT

A polysilane containing insoluble matter and microgel as impurities is purified by dissolving the polysilane in a good solvent to form a polysilane solution, adding a poor solvent to the polysilane solution for causing a minor amount of high molecular weight component to precipitate, thereby agglomerating the insoluble matter and microgel, and removing the resulting agglomerate by filtration. The purifying method of the invention can readily remove the insolubles from the starting polysilane within a short time. A pure polysilane which can form a transparent smooth film is obtainable with commercial advantages.

17 Claims, No Drawings

PURIFICATION OF POLYSILANE

BACKGROUND OF THE INVENTION

1. Field of the Invention

This invention relates to a method for purifying a polysilane containing organic solvent-insoluble matter and microgel.

2. Prior Art

Most often, polysilanes are synthesized by coupling reaction of polyfunctional halosilanes with alkali metals. Most polymer products resulting from this reaction contain organic solvent-insoluble matter and microgel as impurities. Particularly when the starting reactant is a trifunctional or polyfunctional halosilane, a large amount of insoluble matter forms. Additionally, insoluble matter forms in the polysilane during long-term storage.

In the process of preparing polysilanes, the resulting reaction product must be washed with water to remove the alkali halide by-product. The insoluble matter, if present in the reaction product, makes it difficult to separate the aqueous layer. Then the insoluble matter becomes the cause of low yields and low production efficiency.

On the other hand, when polysilanes are applied to photoresists, photosensitive elements, and organic devices, it is desired to form a uniform smooth film from a polymer solution. From the standpoints of yield, production efficiency and film formation, it is necessary to remove the insoluble matter and microgel from the reaction products.

One prior art practice for removing the insoluble matter is by dissolving polysilane in a good organic solvent and subjecting the polysilane solution to centrifugation or filtration. Since the insoluble matter cannot be completely removed by centrifugation, the centrifuged polysilane is unlikely to form a smooth film and thus unsuitable to apply to photoresists and analogues. The filtration method using paper and other filters can remove insolubles of a relatively large size, but not insolubles of a relatively small size, that is, microgel, resulting in a faintly turbid polymer solution. The addition of filter aids would occur to the skilled artisan, but fails to assist in the microgel removal. Polysilane films prepared from such a faintly turbid solution suffer from several drawbacks including low transparency and poor surface smoothness.

When membrane filters are used, clogging occurs because the insoluble matter and microgel have been swollen with the solvent. Then the separation of the insoluble matter and microgel by filtration becomes quite difficult or substantially impossible. A little improvement is achieved by adding filter aids although a very long filtration time is still necessary. This technique is not regarded practical.

It is thus desired to have an effective method capable of purifying a polysilane without the above-mentioned problems.

SUMMARY OF THE INVENTION

An object of the present invention is to provide a novel and improved method for purifying a polysilane by effectively removing the insoluble matter and microgel contained therein as impurities.

The present invention provides a method for purifying a polysilane containing insoluble matter and microgel as impurities. The starting polysilane is dissolved in a good organic solvent to form a polysilane solution. A poor solvent is added to the polysilane solution for causing a minor amount of high molecular weight polysilane component to precipitate, thereby agglomerating the insoluble matter and microgel. The resulting agglomerate is removed by filtration. These steps ensure that the insoluble matter and microgel initially contained in the polysilane as impurities are removed. The invention achieves the efficient purification of polysilane. It is noted that the terms "good" and "poor" solvents are used with respect to polysilanes. A good solvent is a solvent in which polysilanes are well soluble whereas a poor solvent is a solvent in which polysilanes are less soluble.

According to the polysilane purification method of the invention, the insoluble matter and microgel initially contained in the product are precipitated as agglomerates, which can be briefly removed by a simple filtration using filter paper. A high purity polysilane solution from which the insoluble matter and microgel have been completely removed is obtained in a simple manner. The purifying method of the invention is also effective for removing the insoluble matter which has formed during long-term storage.

In general, a polysilane is prepared by reacting an alkali metal and a polyfunctional halosilane. In this process, there is formed an alkali halide by-product which is removed by water washing. In one preferred embodiment of the invention, the purifying method of the invention is carried out prior to this washing step. Since the insoluble matter and microgel are completely removed from the polysilane product, the subsequent washing step becomes quite easy. This contributes to a reduction of the processing time and an improvement in production yield.

The polysilane obtained by the purifying method of the invention does not contain the insoluble matter and microgel and can form a film having high transparency and surface smoothness which will find use in a variety of applications.

DETAILED DESCRIPTION OF THE INVENTION

The purifying method of the invention is described in detail. The starting polysilane is not critical although it is generally prepared by the most common synthesis process of reacting an alkali metal and a polyfunctional halosilane.

The polyfunctional halosilane may be at least one selected from the group consisting of halosilanes having the following general formulae (1), (2) and (3):

$$R^1_a R^2_b SiX_{4-a-b} \tag{1}$$

$$R^3_c R^4_d SiX_{4-c-d} \tag{2}$$

$$X_{3-p-q} R^5_p R^6_q Si-Q-SiR^5_p R^6_q X_{3-p-q} \tag{3}$$

wherein $R^1$ and $R^2$ each are a substituted or unsubstituted monovalent hydrocarbon group, $R^3$, $R^4$, $R^5$ and $R^6$ are independently selected from the group consisting of hydrogen, hydroxyl, halogen, alkoxy, amino, and substituted or unsubstituted monovalent hydrocarbon group, Q is a substituted or unsubstituted divalent hydrocarbon group, or

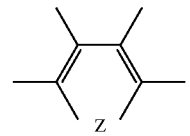

(Z is S, O or N—$R^7$ in which $R^7$ is hydrogen or substituted or unsubstituted alkyl group), letters a, b, c, d, p and q are numbers satisfying: $1 \leq a \leq 2$, $0 \leq b \leq 1$, $1 \leq a+b \leq 2$, $0 \leq c \leq 2$, $0 \leq d \leq 1$, $0 \leq c+d \leq 2$, $0 \leq p \leq 1$, $0 \leq q \leq 1$, $0 \leq p+q \leq 2$.

In formula (1), each of $R^1$ and $R^2$ is a substituted or unsubstituted monovalent hydrocarbon group, preferably having 1 to 12 carbon atoms, more preferably 1 to 6 carbon atoms, for example, an alkyl group including methyl, ethyl, propyl, butyl, hexyl and cyclohexyl, an aryl group including phenyl, tolyl and naphthyl, and an aralkyl group including benzyl. Also included are substituted ones of these unsubstituted monovalent hydrocarbon groups wherein some or all of the hydrogen atoms are replaced by such substituents as alkoxy, amino, alkylamino, and trialkylsilyl groups.

Each of $R^3$, $R^4$, $R^5$ and $R^6$ is a hydrogen atom, hydroxyl, halogen atom such as chlorine and fluorine, alkoxy, amino, or substituted or unsubstituted monovalent hydrocarbon group. The alkoxy groups are preferably those of 1 to 6 carbon atoms, for example, methoxy, ethoxy, propoxy, butoxy, and phenoxy. The substituted or unsubstituted monovalent hydrocarbon groups are preferably those of 1 to 12 carbon atoms, more preferably 1 to 6 carbon atoms. Examples of the monovalent hydrocarbon groups include alkyl, aryl and aralkyl groups as exemplified for $R^1$ and $R^2$.

Q is a substituted or unsubstituted divalent hydrocarbon group or the following group:

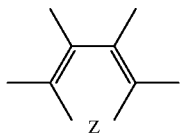

The divalent hydrocarbon group is preferably one of 1 to 12 carbon atoms, especially 1 to 6 carbon atoms, for example, an alkylene group including methylene, ethylene, propylene, butylene, hexylene and cyclohexylene, an arylene group including phenylene, tolylene and naphthylene, and a group in which an alkylene group and arylene group are combined including

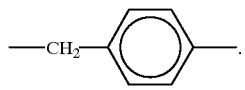

Also included are substituted ones of these unsubstituted divalent hydrocarbon groups wherein some or all of the hydrogen atoms are replaced by such substituents as alkoxy, amino, alkylamino, and trialkylsilyl groups.

Z is S (sulfur), O (oxygen) or N—$R^7$ wherein $R^7$ is a substituted or unsubstituted alkyl group preferably having 1 to 12 carbon atoms, especially 1 to 6 carbon atoms as exemplified for $R_1$ and $R^2$.

Letters a, b, c, d, p and q are numbers satisfying the above-defined ranges. Preferably, $1 \leq a+b \leq 2$, $0 \leq c+d \leq 2$, $0 \leq p+q \leq 2$.

The polysilane preferably has a degree of a polymerization of more than 10. The polysilane prepared by using the halosilane of formula (3) preferably has a —Si—Q—Si— unit (polycarbosilane unit) of 50 mol % or less.

The polysilane may be represented by the following general formula (4):

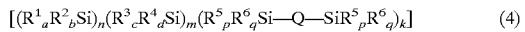

wherein $n \geq 1$, $m \geq 0$, $k \geq 0$, and n+m+k<10, preferably $n \geq 1$, $m \geq 1$, $k \geq 0$, n+m+k$\geq$20, especially n+m+k$\geq$50, and $R^1$, $R^2$, $R^3$, $R^4$, $R^5$, $R^6$, Q, a, b, c, d, p and q are as defined above.

In formula (4), k/(n+m+k) is preferably 0.5 or less.

The starting polysilane to which the purifying method of the invention is applied may be either a polysilane product as just synthesized or a polysilane product after long-term storage. The starting polysilane contains organic solvent-insoluble matter and microgel as impurities.

According to the invention, a good organic solvent is added to the starting polysilane containing insoluble impurities to form a polysilane solution. The good solvent is not critical insofar as the polysilane is soluble therein. Examples of the good solvent include toluene, xylene, tetrahydrofuran, methylene chloride, and chloroform. The preferred amount of the organic solvent added is such that the resulting solution may have a polysilane concentration of about 1 to 30% by weight, especially about 5 to 15% by weight.

Next, a poor organic solvent is added to the polysilane solution. The poor solvent used herein varies with the type of substituent and the degree of polymerization of the polysilane. Exemplary poor solvents include hexane, methanol, ethanol, isopropyl alcohol, and acetone. The preferred amount of the poor solvent added is 10 to 500%, especially 20 to 200% by weight of the polysilane solution. With less than 10% by weight of the poor solvent added, an effective amount of high molecular weight polysilane component would not precipitate and then the insoluble matter and microgel would not agglomerate to a sufficient extent.

After the poor solvent is added to the polysilane solution, a minor amount of high molecular weight polysilane component precipitates and at the same time, the solvent-insoluble matter and microgel contained in the starting polysilane agglomerate. By passing the mixture through a filter, the resulting agglomerates can be readily separated and removed. The filtering technique is not critical. Filtration may be done under gravity, under pressure or under reduced pressure using suitable filter media such as filter paper and plate filters.

After filtration, the solvent is removed from the filtrate, yielding a high purity polysilane free of the insoluble matter and microgel.

The purifying method of the invention is applicable to the conventional process of preparing a polysilane by reacting an alkali metal and a polyfunctional halosilane. More particularly, after polycondensation reaction of a polyfunctional halosilane is effected using an alkali metal, the conventional process involves the steps of quenching the alkali metal residue with an alcohol, effecting hydrolysis, adding a large amount of a poor solvent to the reaction solution to cause the synthesized polysilane to precipitate, collecting the polysilane product containing impurities by filtration, and washing the polysilane product with water to remove the alkali halide by-product. Advantageous results are obtained when the purifying method of the invention is carried out between the collecting step and the water washing step. Since the insoluble matter and microgel are completely removed from the polysilane product, the subsequent washing step becomes quite easy. The invention contributes to a reduction of the processing time and an improvement in production yield.

The purifying method of the invention can easily and satisfactorily remove the organic solvent-insoluble matter and microgel from a polysilane within a short time. A pure polysilane of quality which can form a film having high transparency and surface smoothness is obtainable in a commercially advantageous manner.

EXAMPLE

Examples of the invention are given below by way of illustration and not by way of limitation. In the following Examples, Me is methyl and Ph is phenyl.

Example 1

By reacting sodium and methylphenyldichlorosilane in toluene solvent under reflux, a polysilane product (MePhSi)$_n$ having Mn=23,000 and Mw=97,000 was prepared. 10 g of the polysilane product was dissolved in 90 g of toluene. This polysilane solution appeared faintly bluish white and contained fine insoluble matter.

With stirring, 60 g of hexane was gradually added to the polysilane solution. The mixture was allowed to stand at room temperature for 30 minutes. In this period, a minor amount of a high molecular weight polysilane component precipitated, around which the insoluble matter agglomerated and settled out. The mixture was subject to filtration under pressure (1.5 kg/cm$^2$) using a plate filter (NA-500, retaining particle size 0.5 μm, diameter 47 mm, Advantech Toyo K.K.). A colorless clear toluene solution of polysilane (MePhSi)$_n$ was readily obtained. Upon removal of the solvent, 9.5 g of polysilane (MePhSi)$_n$ having Mn=22,200 and Mw=89,000 was recovered.

For confirmation purposes, a 10% toluene solution of the recovered polymer was prepared. It was found that an entire amount of this solution readily passed a membrane filter having a pore size of 0.2 μm and a diameter of 47 mm. This indicates that the fine insoluble matter had been removed.

Comparative Example 1

A polysilane solution was obtained by dissolving 10 g of the same polysilane product as in Example 1 in 90 g of toluene. This polysilane solution was subject to filtration under pressure (1.5 kg/cm$^2$) using a plate filter (NA-500, retaining particle size 0.5 μm, diameter 47 mm, Advantech Toyo K.K.). The resulting filtrate appeared faintly bluish white and contained fine insoluble matter.

Comparative Example 2

A polysilane solution was obtained by dissolving 10 g of the same polysilane product as in Example 1 in 90 g of toluene. This polysilane solution was subject to filtration under pressure (1.5 kg/cm$^2$) using a membrane filter having a pore size of 0.2 μm (diameter 47 mm). While filtration was continued for 1 hour, the filter was eventually clogged. Only 55 g of the solution could pass through the filter. With this method, it was difficult to remove the insoluble matter completely.

Example 2

Long-term storage after synthesis as in Example 1 resulted in an aged polysilane product (MePhSi)$_n$ having Mn=19,000 and Mw=82,000. 10 g of the aged polysilane product was dissolved in 90 g of toluene. This polysilane solution appeared yellowish, faintly bluish white and contained fine insoluble matter.

With stirring, 45 g of isopropyl alcohol was gradually added to the polysilane solution. The mixture was allowed to stand at room temperature for 30 minutes. In this period, a minor amount of a high molecular weight polysilane component precipitated, around which the insoluble matter agglomerated and settled out. The mixture was subject to filtration under pressure (1.5 kg/cm$^2$) using a plate filter (NA-500, retaining particle size 0.5 μm, diameter 47 mm, Advantech Toyo K.K.). A colorless clear toluene solution of polysilane (MePhSi)$_n$ was readily obtained. Upon removal of the solvent, 9.1 g of polysilane (MePhSi)$_n$ having Mn=17,800 and Mw=76,000 was recovered.

A 10% toluene solution of the recovered polymer readily passed a membrane filter having a pore size of 0.2 μm and a diameter of 47 mm. This indicates that the fine insoluble matter had been removed.

Comparative Example 3

A polysilane solution was obtained by dissolving 10 g of the aged polysilane product as in Example 2 in 90 g of toluene. This polysilane solution was subject to filtration under pressure (1.5 kg/cm$^2$) using a plate filter (NA-500, retaining particle size 0.5 μm, diameter 47 mm, Advantech Toyo K.K.). The resulting filtrate appeared faintly bluish white and contained fine insoluble matter.

Comparative Example 4

A polysilane solution was obtained by dissolving 10 g of the aged polysilane product as in Example 2 in 90 g of toluene. This polysilane solution was subject to filtration under pressure (1.5 kg/cm$^2$) using a membrane filter having a pore size of 0.2 μm (diameter 47 mm). While filtration was continued for 1 hour, the filter was eventually clogged. only 25 g of the solution could pass through the filter. With this method, it was difficult to remove the insoluble matter completely.

Example 3

A four-necked flask was charged with 2.88 g (125 mmol) of metallic sodium and 30 g of xylene in a nitrogen stream. A sodium dispersion was formed by heating at 140° C. and stirring the contents. To the dispersion, 9.6 g (50 mmol) of phenylmethyldichlorosilane was added dropwise. Exothermic reaction took place and the solution turned purple. Heat refluxing and stirring was continued for 7 hours. The sodium was deactivated with 5 ml of methanol. Water, 50 g, was added for hydrolysis. The reaction mixture contained insoluble matter and did not separate into organic and aqueous layers. Next, 100 g of isopropyl alcohol was added to the reaction mixture for causing a polysilane polymer to precipitate. By suction filtration using filter paper, the polysilane polymer containing insoluble matter was collected.

To the polysilane polymer, 60 g of toluene was added and then 48 g of hexane was gradually added. The mixture was allowed to stand at room temperature for 30 minutes. In this period, a minor amount of a high molecular weight polysilane component precipitated, around which the insoluble matter agglomerated and settled out. The mixture was subject to filtration under pressure (1.5 kg/cm$^2$) using a plate filter (NA-500, retaining particle size 0.5 μm, diameter 47 mm, Advantech Toyo K.K.). A colorless clear toluene solution of polysilane was readily obtained.

The solution was washed with water 5 times for removing ionic impurities. Quick separation occurred between an organic layer and an aqueous layer and the overall time required for washing was within 1 hour. By concentrating the organic layer, an appropriate molecular weight methylphenylpolysilane having Mn=17,500 and Mw=60,600 was collected as a white solid in a yield of 48%.

Comparative Example 5

A polysilane was prepared as in Example 3 except that the step of removing the insoluble matter from the polysilane polymer using hexane was omitted. Due to the presence of the insoluble matter, the water washing step encountered slow separation between an organic layer and an aqueous layer. The overall time required for washing was 5 hours. The yield lowered to 40%.

Example 4

A four-necked flask was charged with 2.88 g (125 mmol) of metallic sodium and 30 g of xylene in a nitrogen stream.

A sodium dispersion was formed by heating at 140° C. and stirring the contents. To the dispersion, 9.6 g (50 mmol) of phenylmethyldichlorosilane and 0.42 g (2 mmol) of phenyltrichlorosilane were added dropwise. Exothermic reaction took place and the solution turned purple. Heat refluxing and stirring was continued for 7 hours. The sodium was deactivated with 5 ml of methanol. Water, 50 g, was added for hydrolysis. The reaction mixture contained insoluble matter and did not separate into organic and aqueous layers. Next, 100 g of isopropyl alcohol was added to the reaction mixture for causing a polysilane polymer to precipitate. By suction filtration using filter paper, the polysilane polymer containing insoluble matter was collected.

To the polysilane polymer, 60 g of toluene was added and then 48 g of hexane was gradually added. The mixture was allowed to stand at room temperature for 30 minutes. In this period, a minor amount of a high molecular weight polysilane component precipitated, around which the insoluble matter agglomerated and settled out. The mixture was subject to filtration under pressure (1.5 kg/cm$^2$) using a plate filter (NA-500, retaining particle size 0.5 μm, diameter 47 mm, Advantech Toyo K.K.). A colorless clear toluene solution of polysilane was readily obtained.

The solution was washed with water 5 times for removing ionic impurities. Quick separation occurred between an organic layer and an aqueous layer and the overall time required for washing was 1 hour. By concentrating the organic layer, a polysilane having Mn=18,140 and Mw=39,000 was collected as a white solid in a yield of 44%.

Comparative Example 6

A polysilane was prepared as in Example 4 except that the step of removing the insoluble matter from the polysilane polymer using hexane was omitted. Due to the presence of the insoluble matter, the water washing step encountered slow separation between an organic layer and an aqueous layer. The overall time required for washing was 5 hours. The yield lowered to 35%.

Example 5

By reacting 31.3 g (1.36 mol) of sodium, 96.0 g (0.5 mol) of methylphenyldichlorosilane and 32.9 g (0.125 mol) of p-bis(dimethylchlorosilyl)benzene in toluene solvent under reflux, a polysilane product represented by

[(MePhSi)$_4$ (Me$_2$Si—C$_6$H$_4$—SiMe$_2$)$_1$]$_n$ having Mn=11,000 and Mw=41,600 was prepared. 10 g of the polysilane product was dissolved in 90 g of toluene. This polysilane solution appeared slightly turbid and contained fine insoluble matter.

With stirring, 50 g of hexane was gradually added to the polysilane solution. The mixture was allowed to stand at room temperature for 30 minutes. In this period, a minor amount of a high molecular weight polysilane component precipitated, around which the insoluble matter agglomerated and settled out. The mixture was subject to filtration under pressure (1.5 kg/cm$^2$) using a plate filter (NA-500, retaining particle size 0.5 μm, diameter 47 mm, Advantech Toyo K.K.). A colorless clear toluene solution of polysilane was readily obtained. Upon removal of the solvent, 9.2 g of polysilane [(MePhSi)$_4$ (Me$_2$Si—C$_6$H$_4$—SiMe$_2$)$_1$]$_n$ having Mn=10,500 and Mw=39,900 was recovered.

For confirmation purposes, a 10% toluene solution of the recovered polymer was prepared. It was found that an entire amount of this solution readily passed a membrane filter having a pore size of 0.2 μm and a diameter of 47 mm. This indicates that the fine insoluble matter had been removed.

Comparative Example 7

A polysilane solution was obtained by dissolving 10 g of the same polysilane product as in Example 5 in 90 g of toluene. This polysilane solution was subject to filtration under pressure (1.5 kg/cm$^2$) using a plate filter (NA-500, retaining particle size 0.5 μm, diameter 47 mm, Advantech Toyo K.K.). The resulting filtrate appeared slightly turbid and contained fine insoluble matter.

Comparative Example 8

A polysilane solution was obtained by dissolving 10 g of the same polysilane product as in Example 5 in 90 g of toluene. This polysilane solution was subject to filtration under pressure (1.5 kg/cm$^2$) using a membrane filter having a pore size of 0.2 μm (diameter 47 mm). While filtration was continued for 1 hour, the filter was eventually clogged. Only 80 g of the solution could pass through the filter. With this method, it was difficult to remove the insoluble matter completely.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for purifying a polysilane containing insoluble matter and microgel as impurities, comprising:

dissolving the polysilane in a good organic solvent to form a polysilane solution having a polysilane concentration of about 1 to 30% by weight, adding a poor solvent to the polysilane solution in an amount of 10 to 60% by weight of the polysilane solution for causing a minor amount of high molecular weight polysilane component to precipitate, thereby agglomerating the insoluble matter and microgel, and removing the resulting agglomerate with the precipitated high molecular weight polysilane by filtration, thereby obtaining a purified polysilane product in which the insoluble matter and microgel are removed.

2. The purifying method of claim 1 wherein the polysilane is prepared by reacting an alkali metal and at least one halolilane selected from the group consisting of polyfunctional halosilanes of formulae (1), (2) and (3):

$R^1_a R^2_b SiX_{4-a-b}$ (1)

$R^3_c R^4_d SiX_{4-c-d}$ (2)

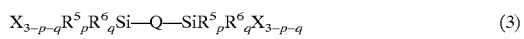

$X_{3-p-q} R^5_p R^6_q Si—Q—SiR^5_p R^6_q X_{3-p-q}$ (3)

wherein $R^1$ and $R^2$ each are a substituted or unsubstituted monovalent hydrocarbon group, $R^3$, $R^4$, $R^5$ and $R^6$ are independently selected from the group consisting of hydrogen, hydroxyl, halogen, alkoxy, amino, and substituted or unsubstituted monovalent hydrocarbon group, Q is a substituted or unsubstituted divalent hydrocarbon group, or

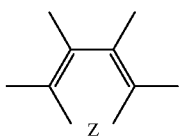

(Z is S, O or N—R$^7$ in which R$^7$ is hydrogen or substituted or unsubstituted alkyl group), letters a, b, c, d, p and q are numbers satisfying: $1 \leq a \leq 2$, $0 \leq b \leq 1$, $1 \leq a+b \leq 2$, $0 \leq c \leq 2$, $0 \leq d \leq 1$, $0 \leq c+d \leq 2$, $0 \leq p \leq 1$, $0 \leq q \leq 1$, $0 \leq p+q \leq 2$.

3. A method for preparing and purifying a polysilane containing insoluble matter and microgel as impurities, comprising:

reacting an alkali metal and a polyfunctional halosilane to produce a polysilane containing the insoluble matter and microgel as well as an alkali halide by-product, dissolving the polysilane in a good organic solvent to form a polysilane solution, adding a poor solvent to the polysilane solution for causing a minor amount of high molecular weight polysilane component to precipitate, thereby agglomerating the insoluble matter and microgel, removing the resulting agglomerate with the precipitated high molecular weight polysilane by filtration, and, subsequently, washing the filtrate with water to remove the alkali halide by-product, thereby obtaining a purified polysilane product in which the insoluble matter and microgel as well as the alkali halide by-product are removed.

4. The method of claim 2, wherein:

each of $R^1$ and $R^2$ is a monovalent hydrocarbon group of 1 to 12 carbon atoms optionally substituted by alkoxy, amino, alkylamino or trialkylsilyl groups, each of $R^3$, $R^4$, $R^5$ and $R^6$ is a hydrogen atom, hydroxyl, chlorine atom, fluorine atom, alkoxy of 1 to 6 carbon atoms or a monovalent hydrocarbon group of 1 to 12 carbon atoms optionally substituted by alkoxy, amino, alkylamino or trialkylsilyl groups, Q is a divalent hydrocarbon group of 1 to 12 carbon atoms optionally substituted by alkoxy, amino, alkylamino or trialkylsilyl groups or a group

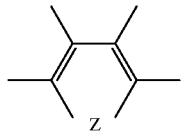

where Z is S, O or N—$R^7$ where $R^7$ is an alkyl group optionally substituted by alkoxy, amino, alkylamino or trialkylsilyl groups.

5. The method of claim 2, wherein, in formulae (1), (2) and (3), letters a, b, c, d, p and q satisfy $1 \geq a+b \geq 2$, $0 \geq c+d \geq 2$ and $0 \geq p+q \geq 2$.

6. The method of claim 1, wherein the polysilane has a degree of polymerization of more than 10.

7. The method of claim 1, wherein the good organic solvent is toluene, xylene, tetrahydrofuran, methylene chloride or chloroform.

8. The method of claim 1, wherein the good organic solvent is used in an amount to provide a polysilane solution having a polysilane concentration of 5 to 15% by weight.

9. The method of claim 1, wherein the poor solvent is hexane, methanol, ethanol, isopropyl alcohol or acetone.

10. The method of claim 1, wherein the amount of the poor solvent added is from 20 to 60% by weight of the polysilane solution.

11. The method of claim 1, wherein the resulting purified polysilane product passes completely through a membrane filter having a pore size of 0.2 μm.

12. The method of claim 3, wherein the polysilane has a degree of polymerization of more than 10.

13. The method of claim 3, wherein the good organic solvent is toluene, xylene, tetrahydrofuran, methylene chloride or chloroform.

14. The method of claim 3, wherein the good organic solvent is used in an amount to provide a polysilane solution having a polysilane concentration of 1 to 30% by weight.

15. The method of claim 3, wherein the poor solvent is hexane, methanol, ethanol, isopropyl alcohol or acetone.

16. The method of claim 3, wherein the amount of the poor solvent added is from 10 to 60% by weight of the polysilane solution.

17. The method of claim 3, wherein the resulting purified polysilane product passes completely through a membrane filter having a pore size of 0.2 μm.

* * * * *